UNITED STATES PATENT OFFICE.

OTTO SCHMIDT, OF LUDWIGSHAFEN-ON-THE-RHINE, GERMANY, ASSIGNOR TO BADISCHE ANILIN & SODA FABRIK, OF LUDWIGSHAFEN-ON-THE-RHINE, GERMANY, A CORPORATION.

COMPOSITION OF MATTER RESEMBLING CELLULOID.

1,200,886.     Specification of Letters Patent.     Patented Oct. 10, 1916.

No Drawing.     Application filed October 21, 1914. Serial No. 867,714.

*To all whom it may concern:*

Be it known that I, OTTO SCHMIDT, citizen of the German Empire, residing at Ludwigshafen-on-the-Rhine, Germany, have invented new and useful Improvements in Compositions of Matter Resembling Celluloid, of which the following is a specification.

I have discovered new compositions of matter resembling celluloid, which contain a cellulose ester, such as nitrocellulose or acetyl-cellulose, and also an acyl compound of a completely hydrogenized aromatic amin. The acyl compounds of completely hydrogenized aromatic amins are easily obtainable on a large scale, and they are very efficient in causing the nitrocellulose, or other derivative of cellulose, to swell, and in dissolving it. The masses obtained are odorless and colorless, and have but small specific gravity and excellent stability against the action of heat and light.

The following examples will serve to illustrate further the nature of this invention, which, however, is not confined to these examples. The parts are by weight.

Example 1: Mix together thirty-five parts of acetyl-dicyclo-hexylamin (which possesses the formula

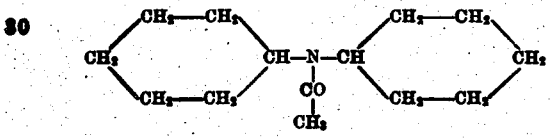

and can be obtained by acetylating the dicyclo-hexylamin, described by Sabatier and Senderens, *Comptes Rendus* vol. 138, page 458) and eighty-two parts of nitrocellulose together with a little alcohol, and then work up the mixture. A very fine, colorless celluloid-like product is obtained.

Example 2: Dissolve thirty parts of acetyl-dicyclo-hexylamin and seventy parts of acetone-soluble acetyl-cellulose in a mixture of alcohol, acetone and ethyl-methyl-ketone, and work up the solution. A fine transparent colorless celluloid-like product is obtained.

Example 3: Mix thirty parts of para-toluene-sulfo-dicyclo-hexylamin (obtainable from dicyclo-hexylamin by the action of para-toluene-sulfo-chlorid) with seventy parts of nitrocellulose in the presence of alcohol, and work up the mixture. A fine flexible celluloid-like product is obtained.

Now what I claim is:—

1. A new composition of matter resembling celluloid containing a cellulose ester and an acyl compound of a completely hydrogenized aromatic amin.

2. A new composition of matter resembling celluloid containing a cellulose ester and acetyl-dicyclo-hexylamin.

3. A new composition of matter resembling celluloid containing nitrocellulose and acetyl-dicyclo-hexylamin.

In testimony whereof I have hereunto set my hand.

OTTO SCHMIDT.